United States Patent
Uno et al.

(10) Patent No.: US 8,519,725 B2
(45) Date of Patent: Aug. 27, 2013

(54) HYBRID OCCUPANT DETECTION SYSTEM

(75) Inventors: Hideki Uno, Toyota (JP); Junko Shima, Nissin (JP); Yasuhiro Ishiguro, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 358 days.

(21) Appl. No.: 13/042,753

(22) Filed: Mar. 8, 2011

(65) Prior Publication Data

US 2011/0221459 A1    Sep. 15, 2011

(30) Foreign Application Priority Data

Mar. 11, 2010 (JP) ................................. 2010-055040

(51) Int. Cl.
*G01R 27/26* (2006.01)
*G01R 27/08* (2006.01)
*G08B 13/26* (2006.01)

(52) U.S. Cl.
USPC ........................... 324/663; 324/713; 340/562

(58) Field of Classification Search
USPC .................................. 324/663, 713; 340/562
See application file for complete search history.

(56) References Cited

U.S. PATENT DOCUMENTS

| 7,701,338 B2 * | 4/2010 | Kamizono et al. ............ 340/561 |
| 2010/0102833 A1 | 4/2010 | Uno et al. |

FOREIGN PATENT DOCUMENTS

| JP | 2000-75044 | 3/2000 |
| JP | 2007-240515 | 9/2007 |

OTHER PUBLICATIONS

U.S. Appl. No. 13/033,781 to Hideki Uno et al., which was filed Feb. 24, 2011.

\* cited by examiner

*Primary Examiner* — Amy He
(74) *Attorney, Agent, or Firm* — Greenblum & Bernstein, P.L.C.

(57) ABSTRACT

An occupant detection system includes a detection electrode provided in a vehicle seat, a phase difference measuring unit, a direct current measuring unit, and a detecting unit that detects an occupant. The phase difference measuring unit supplies a reference signal comprising a sinusoidal wave to the detection electrode via a resistive element, detects the potential of the detection electrode as an electrode signal, and measures a phase lag time of the electrode signal relative to the reference signal. The direct current measuring unit applies a steady DC voltage to the detection electrode via a resistive element, detects the potential of the detection electrode, and measures time it takes from start of application of the DC voltage to the time when the detection electrode reaches a given potential, as a charge time. The detecting unit detects an occupant based on the phase lag time and the charge time.

10 Claims, 13 Drawing Sheets

FIG. 6
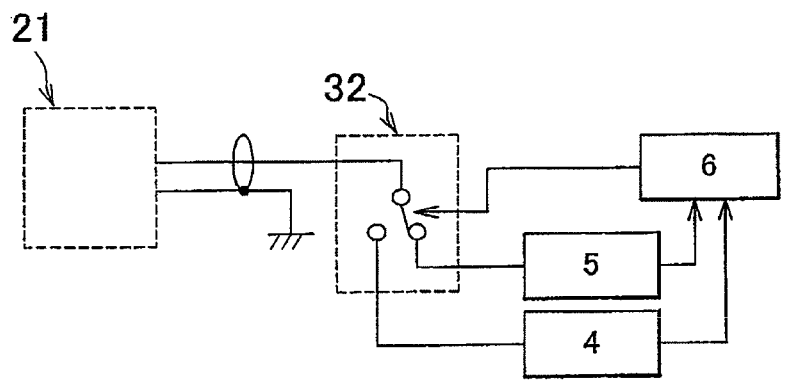
FIG. 7A $S_0$
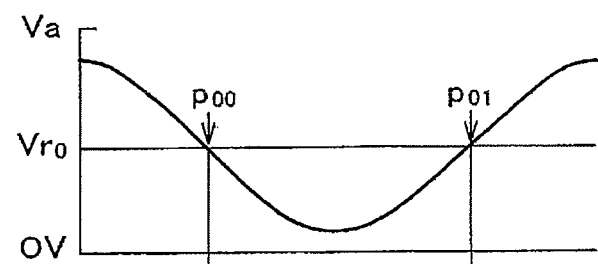
FIG. 7B $S_1$
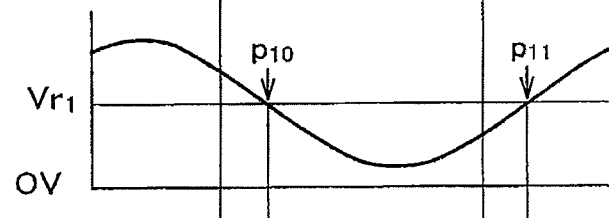
FIG. 7C $D_0$
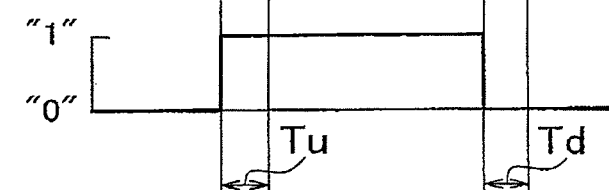
FIG. 7D $D_1$
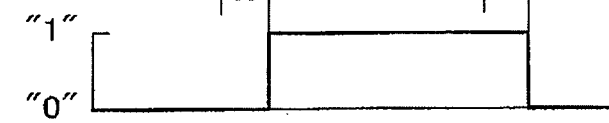

FIG.8
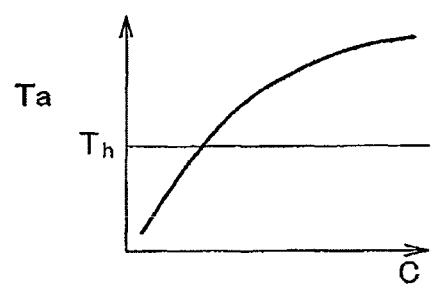
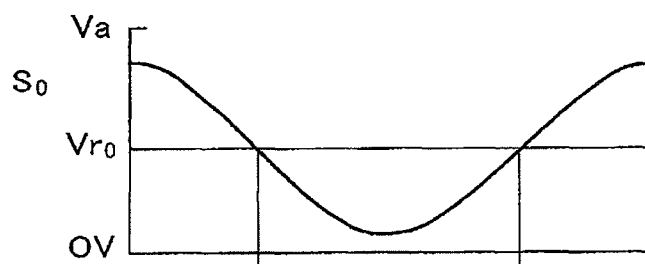
FIG.9A $S_0$
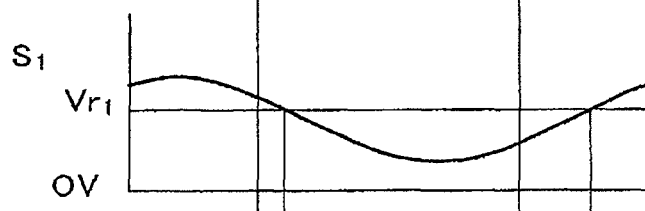
FIG.9B $S_1$
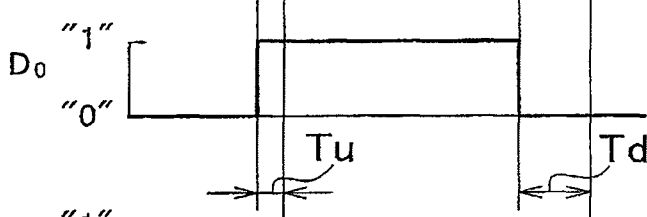
FIG.9C $D_0$
FIG.9D $D_1$ FIG. 13
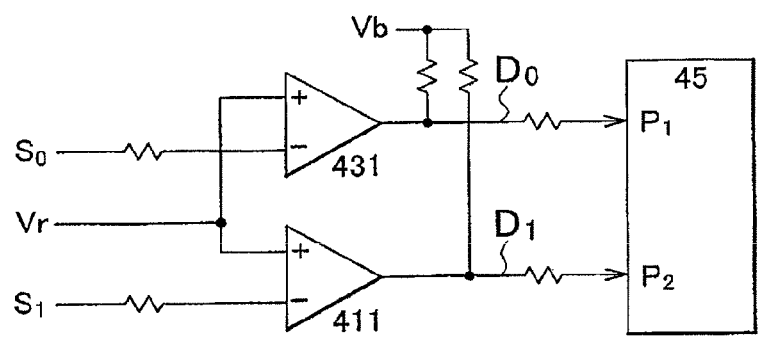
FIG. 14A
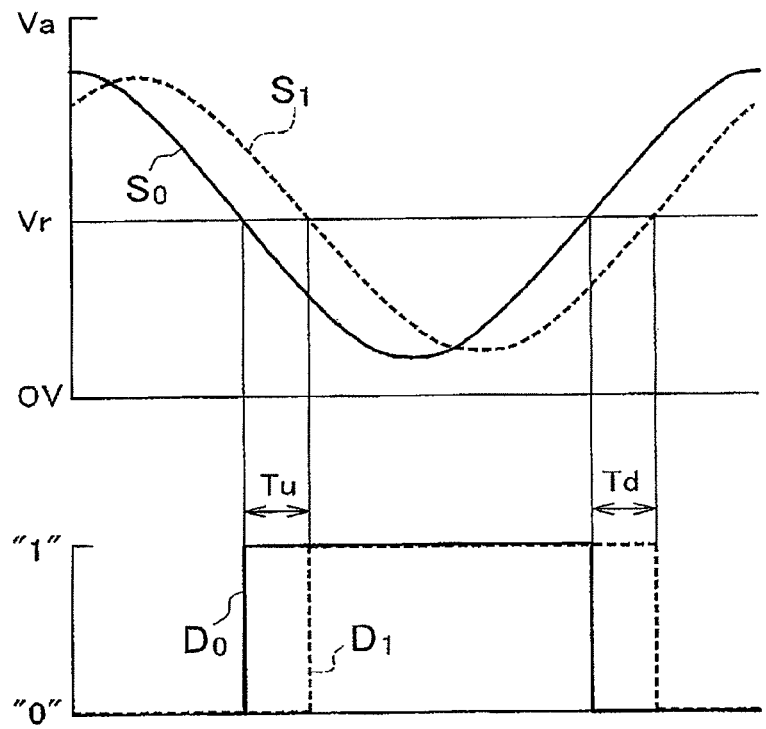
FIG. 14B

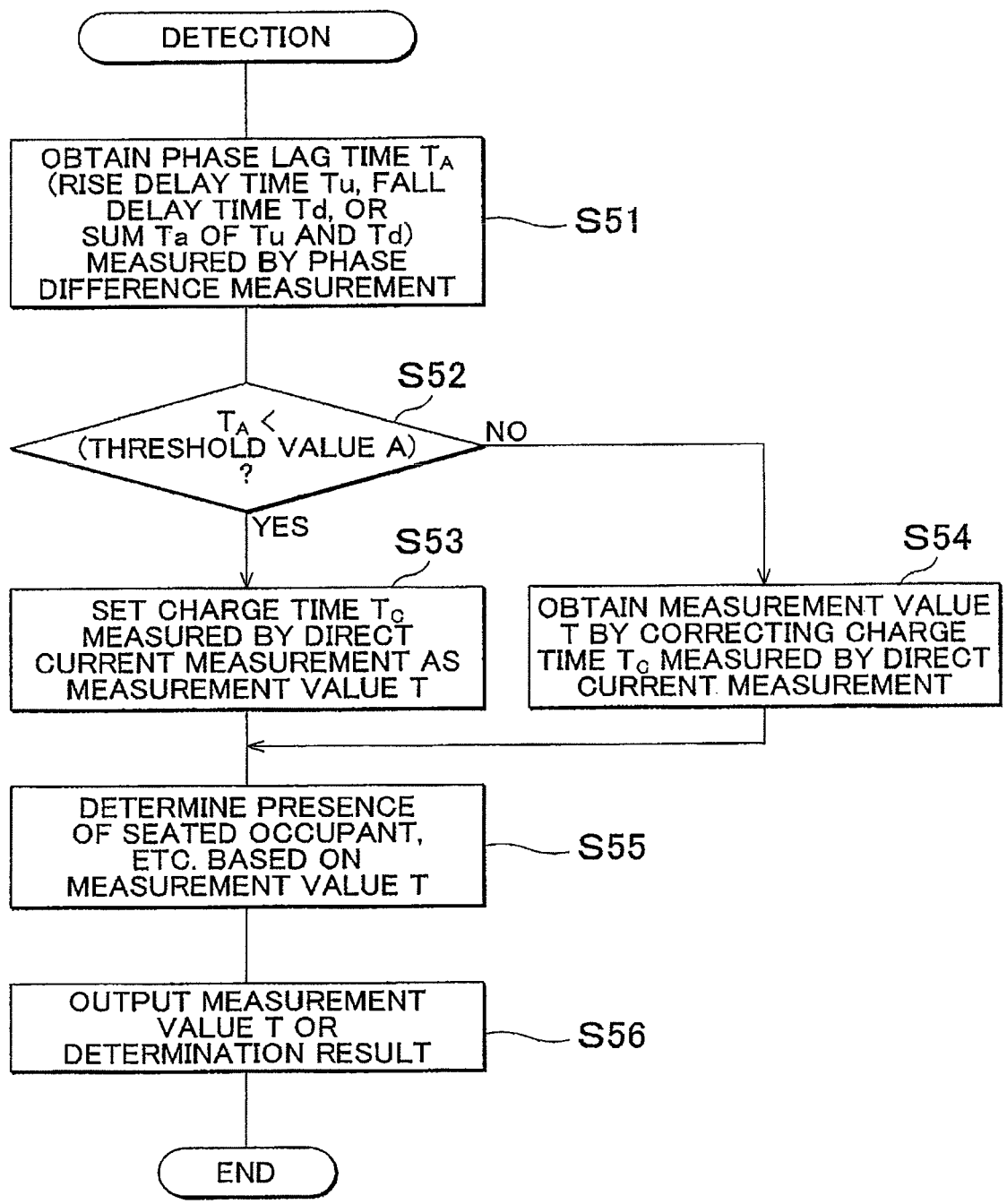

HYBRID OCCUPANT DETECTION SYSTEM

The disclosure of Japanese Patent Application No. 2010-055040 filed on Mar. 11, 2010 including the specification, drawings and abstract is incorporated herein by reference in its entirety.

BACKGROUND OF THE INVENTION

1. Field of the Invention

The invention relates to an occupant detection system for detecting if an occupant is present in a vehicle seat, and more particularly to an occupant detection system that is able to detect an occupant with stability even when the vehicle seat is wet, for example.

2. Description of the Related Art

In automobiles, detected information as to whether an occupant is present in a seat is used for determining whether an air bag is to be deployed or inflated. A vehicle air-bag system is controlled so that an air bag deploys when an occupant is present in a seat, such as a passenger's seat, at the time of a collision of the vehicle, and the air bag does not deploy when no occupant is present in the seat. Also, in the case where the occupant sitting in the seat is a child having a small body size, for example, the air bag is required not to deploy even at the time of a collision of the vehicle. While various methods for detecting a seating condition of an occupant or the body size or shape of the occupant have been used, a capacitance-based occupant detection system is known, for example. Since a human body is a dielectric, the capacitance introduced between a detection electrode provided in a seat bottom or seatback portion of the seat and the vehicle body varies depending upon whether an occupant is present in the seat or no occupant is present in the seat. If an electric field is generated around the detection electrode, disturbances arise in the electric field when an occupant is seated in the seat. The capacitance-based occupant detection system detects the variation in the capacitance by detecting a change of voltage or current or disturbances in the electric field, for example, so as to determine whether an occupant is seated. An occupant detection system including a plurality of strip antenna electrodes disposed in horizontal positions while being vertically spaced from each other, in a seatback portion of a seat, is disclosed (see Japanese Patent Application Publication No. 2000-75044 (JP-A-2000-75044)), as an occupant detection system that accurately detects if the occupant is an adult or a child, and permits an air-bag device to be deployed when an adult is seated in the seat.

In the capacitance-based occupant detection system, the detection electrode or electrodes used for detecting an occupant is/are disposed on the surface of the vehicle seat or immediately below the seat surface. Therefore, if the seat gets wet, the impedance around the detection electrode(s) may change, or a wet portion may act as an antenna, which may result in a problem that a determination as to the presence of a seated occupant or whether the occupant is an adult or a child is erroneously made. In order to prevent or reduce the possibility of erroneous detection of an occupant due to a wet condition of the seat, an occupant detection system (as disclosed in Japanese Patent Application Publication No. 2007-240515 (JP-A-2007-240515)) has been proposed which applies a load current to an antenna electrode provided in the seat so as to generate a very weak electric field, while detecting a potential current that passes through the antenna electrode, and calculates the impedance and phase difference from the load current and the potential current, so as to detect an occupant based on the calculated impedance and phase difference.

The occupant detection system disclosed in JP-A-2000-75044 causes a very weak electric field to be selectively generated around the above-indicated plurality of antenna electrodes, and extracts or finds the shoulder line of the occupant by detecting current that passes through the antenna electrodes, so as to detect if the occupant is an adult or a child. However, in a condition where the back and head of the occupant are not in contact with the seatback of the seat, the system may not be able to accurately discriminate between an adult and a child. For example, if the occupant sits in a forward leaning position, it is impossible to discriminate between an adult and a child. Also, a large number of electrodes need to be installed in the seatback portion of the seat, and a switching circuit, or the like, for selectively using the electrodes needs to be provided, thus making the configuration and control of the system complicated.

In the occupant detection system disclosed in JP-A-2007-240515, the impedance and phase difference are calculated from the load current and potential current of the antenna electrode provided in the seat, and an occupant is detected based on the calculated impedance and phase difference, for prevention of erroneous detection due to wetting of the seat, for example. However, there is a need to provide electrodes for proximity measurement, which are used for measuring the impedance and the phase difference. Also, a complicated operation or processing needs to be performed to calculate the impedance and the phase difference from the measured load current and potential current, determine a threshold value based on the calculated phase difference, and compares the impedance with the threshold value. As described above, it is difficult or impossible for the known occupant detection systems to accurately determine the body size of a seated occupant (e.g., discriminate between an adult and a child), and also make the determination with accuracy even when there is a disturbance, such as wetting of the seat. Also, it is necessary to provide a plurality of electrodes for solving the respective problems as described above, which makes the configuration and processing complicated.

SUMMARY OF THE INVENTION

The invention provides an occupant detection system that is able to accurately sense the presence of an occupant in a seat and determine the body size or shape of the occupant, and is also able to stably detect an occupant even when there is a disturbance, such as when the seat is wet.

An occupant detection system according to one aspect of the invention includes a detection electrode provided in at least one of a seat bottom and a seatback of a seat, a phase difference measuring unit that supplies a reference signal comprising a sinusoidal wave to the detection electrode via a resistive element, detects the potential of the detection electrode as an electrode signal, and measures a phase lag time of the electrode signal relative to the reference signal, a direct current measuring unit that applies a steady DC voltage to the detection electrode via a resistive element, detects the potential of the detection electrode, and measures time it takes from start of application of the DC voltage to the detection electrode to the time when the detection electrode reaches a given potential, as a charge time, and a detecting unit that detects an occupant based on the phase lag time and the charge time, using the phase difference measuring unit and the direct current measuring unit.

The occupant detection system according to the above aspect of the invention includes the detection electrode provided in the vehicle seat, and the phase difference measuring unit that supplies a sinusoidal reference signal to the detection electrode via the resistive element, detects the potential of the detection electrode as an electrode signal, and measures the phase lag time of the electrode signal relative to the reference signal. With this arrangement, the system is able to detect a condition of disturbance, such as a wet condition of the seat. Also, the occupant detection system includes the direct current measuring unit that applies a steady DC voltage to the detection electrode via the resistive element, detects the potential of the detection electrode, and measures time it takes from start of application of the DC voltage to the detection electrode to the time when the potential of the detection electrode reaches a given level, as a charge time. With this arrangement, the system is able to sense the presence of an occupant in the seat and determine the body size of the occupant (i.e., whether the occupant is an adult or a child, for example), without being influenced by the seating posture of the occupant. The occupant detection system further includes the detecting unit that detects an occupant based on the phase lag time and the charge time, using the phase difference measuring unit and the direct current measuring unit. Thus, the system is able to accurately detect an occupant while removing an influence of disturbance, by detecting the presence of an occupant in the seat and the body size of the occupant mainly based on the charge time, and detecting a condition where there is a disturbance factor, such as a wet condition of the seat, mainly based on the phase lag time. Namely, a hybrid occupant detection system can be provided which makes use of the advantage of phase difference measurement and the advantage of direct current measurement. Also, there is no need to use a special sensor or sensors for preventing or reducing the possibility of erroneous detection due to a seating posture of the occupant or wetting of the seat, for example, and the use of a single detection electrode makes it possible to detect an occupant with accuracy and stability.

When the phase lag time exceeds a predetermined value, the detecting unit may correct the charge time in accordance with the phase lag time, and detect an occupant based on the corrected charge time. In this case, since the measurement value obtained by the direct current measuring unit is corrected in accordance with the degree of disturbance, such as wetness of the seat, the occupant can be accurately detected.

The occupant detection system may further include a switching circuit for connecting one of the phase difference measuring unit and the direct current measuring unit with the detection electrode. In this case, switching between measurement of the phase lag time and measurement of the charge time can be effected as, needed, thus making control and measuring operations further simplified.

The detection electrode may be a conductive cloth, and the conductive cloth may be formed as a surface material of the seat, or the detection electrode may be disposed immediately below the seat surface. In this case, the occupant detection system operates with stability or reliability even when the detection electrode is in a wet condition, and the texture and breathability of the seat do not deteriorate. Also, the detection electrode may be formed integrally as a part of the exterior of the seat.

The conductive cloth may be a woven fabric into which conductive fibers are woven at fixed intervals. In this case, the occupant detection system is advantageous in the use of the detection electrode that is excellent in terms of durability and cost efficiency or economy.

The phase difference measuring unit may include a first comparator circuit that produces a binary reference phase signal by comparing the voltage of the reference signal with a predetermined threshold value, and a second comparator circuit that produces a binary electrode phase signal by comparing the electrode signal with a second threshold value. The second threshold value is set so that a phase of the reference signal at a point at which the reference signal passes the first threshold value is substantially the same as that of the electrode signal at a point at which the electrode signal passes the second threshold value. In this case, the timing or points in time at which the reference signal and the electrode signal reach substantially the same phase can be detected using a simple circuit. Then, a rise delay time and a fall delay time of the electrode phase signal relative to the reference phase signal are measured, as the phase delay time, so that processing corresponding to the phase difference can be easily performed.

The electrode signal may be produced as a signal having substantially the same amplitude as that of the reference signal, and the first comparator circuit and the second comparator circuit may produce the reference phase signal and the electrode phase signal, respectively, using the respective threshold values that are equal to each other. In this case, the occupant detection system can be provided by using an extremely small number of components and simple circuit configuration.

The detecting unit may obtain the sum of the rise delay time and the fall delay time, and may detect an occupant based on the sum and the charge time. In this case, an occupant can be detected based on the sum that is not influenced by a wet condition of the seat, and the charge time from which the body size of the occupant can also be determined. Thus, the occupant detection system operates with stability through extremely simple processing.

The direct current measuring unit may include a voltage application circuit that applies the steady DC voltage to the detection electrode, and a potential detection circuit that makes a determination that a voltage between the detection electrode and ground reaches a predetermined threshold value, and a length of time it takes from the time when the voltage application circuit starts application of the DC voltage to the time when the determination is made by the potential detection circuit may be measured as the charge time. In this case, the occupant detection system having a simple circuit configuration and operable with simple processing can be provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6 is a block diagram showing an example in which the coupling unit of the occupant detection system of the invention is provided by a switching circuit;

FIG. 7A to FIG. 7D are timing charts useful for explaining the basic operation of the phase difference measuring unit of the occupant detection system;

FIG. 8 is a graph indicating the relationship between the capacitance between electrodes and the phase lag time;

FIG. 9A to FIG. 9D are timing charts useful for explaining the operation of the phase difference measuring unit in a condition where there is a disturbance, such as wetting of the seat;

FIG. 13 is a circuit diagram showing an example of first comparator and second comparator included in the phase difference measuring unit;

FIG. 14A and FIG. 14B are timing charts useful for explaining the operation of the phase difference measuring unit when the electrode signal is produced as a signal having substantially the same amplitude as the reference electrode;

FIG. 26 is a flowchart illustrating an example of occupant detecting method implemented by the detecting unit.

DETAILED DESCRIPTION OF EMBODIMENTS

The matters indicated herein are exemplary ones and those for explaining embodiments of this invention for illustrative purposes, and are stated in order to provide explanations supposed to make the principle of the invention and its conceptual features understood most effectively without difficulty.

The capacitance between a detection electrode provided in a vehicle seat and the vehicle body varies between the case where the vehicle seat is empty (i.e., no occupant is present in the seat) and the case where an occupant is present in the seat. An occupant detection system according to one embodiment of the invention is configured to detect an occupant, using a combination of a phase difference measuring unit that measures a phase lag of a sinusoidal signal detected at the detection electrode relative to a reference signal comprising a sinusoidal wave, which phase lag occurs due to the presence of an occupant in the seat, and a direct current measuring unit that applies a DC voltage to the detection electrode, and measures a change in charge time of the capacitance. Namely, the occupant detection system is a hybrid system using a phase difference measuring method and a direct current measuring method, and aims at accurately sensing the presence of an occupant in the seat and determining the body size or shape of the occupant mainly by direct current measurement, while removing an influence of disturbance, such as a wet condition of the seat, by phase difference measurement.

Figure 1:
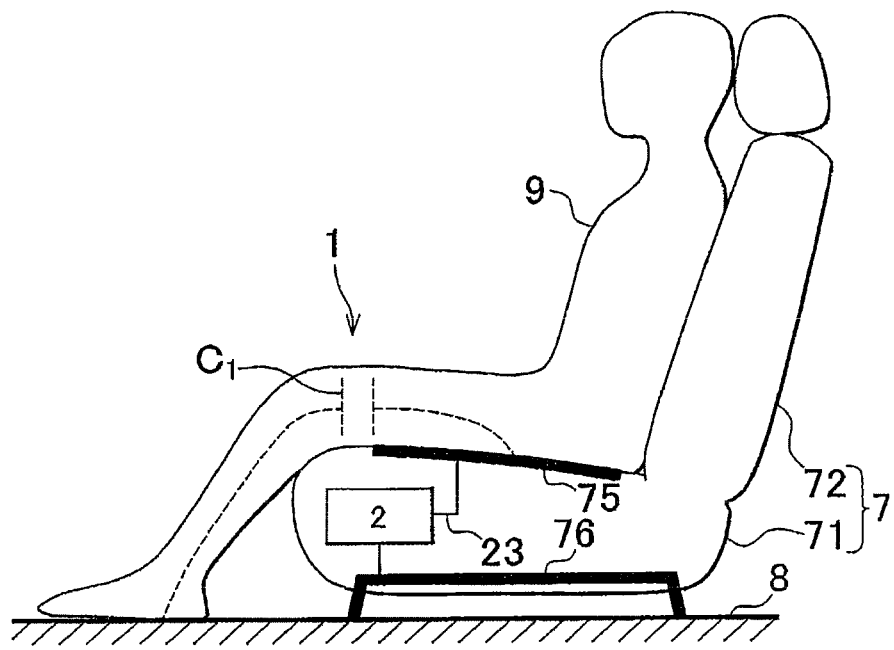
FIG. 1 is a schematic diagram showing the general construction of a vehicle seat and its surroundings, including an occupant detection system of the invention.

FIG. 1 schematically illustrates a vehicle seat incorporating the occupant detection system of this embodiment, and its surroundings. In FIG. 1, the seat 7 is a passenger's seat or a rear seat, for example. When an occupant 9 is seated in the seat 7, the capacitance C1 is introduced by the occupant's body 9 interposed between a detection electrode 75 and a vehicle body 8. When a signal comprising a sinusoidal wave is supplied to the detection electrode 75, a phase difference of the signal detected at the detection electrode 75 relative to the reference signal changes due to a change in the capacitance between the detection electrode 75 and the vehicle body 8. When a DC voltage is applied to the detection electrode 75, the charge time of the capacitance changes due to a change in the capacitance between the detection electrode 75 and the vehicle body 8. By measuring the amounts of the respective changes, it is possible to determine the presence or absence of an occupant in the seat. The occupant detection system 1 includes a sensor portion including the detection electrode 75, and an electronic control unit (ECU) 2 that performs measuring and determining operations. The ECU 2 includes the above-described phase difference measuring unit, direct current measuring unit, and a detecting unit.

The seat 7 as shown in FIG. 1 consists of a seat bottom 71 and a seatback 72, and is fixed to a floor 8 of the vehicle body via a seat frame 76. The vehicle body 8 is electrically at a ground potential (the vehicle is grounded) that provides a basis of the potential of the detection electrode 75. If the seat frame 76 is made of metal, the seat frame 76 may act as a ground electrode. The interior of the seat bottom 71 of the seat comprises cushioning formed of a urethane foam, or the like, which is placed on the seat frame 76, and the seat bottom 71 is covered with a surface material, such as a woven fabric.

Similarly, the seatback 72 is comprised of a seat frame, cushioning, a surface material, and so forth.

The detection electrode 75 for detecting a seated occupant is provided in a top seating portion of the seat bottom 71 of the seat. The detection electrode 75 may provide a part of the surface material with which the seat 7 is covered, or may be placed immediately below the surface material, namely, interposed between the surface material and the cushioning. A wide variety of materials having electrical conductivity may be used for the detection electrode 75. For example, a fabric having conductivity, a cloth formed by weaving metal wires into meshes, a conductive film, a metal plate, or the like, may be used to form the detection electrode 75. Preferably, a conductive cloth may be used as the detection electrode 75. The conductive cloth means a cloth to which electrical conductivity is given, and its material and manufacturing method are not particularly limited. One example of such conductive cloth is produced by using conductive fibers whose surfaces are covered with a metal, such as copper, nickel, or silver. The conductive cloth may be a sheet of woven fabric formed by weaving threads of conductive fibers, or may be a sheet of unwoven fabric formed from conductive fibers by thermal compression, or the like, without weaving the conductive fibers. The conductive cloth may also be formed by covering woven fabric or unwoven fabric using non-conductive threads, with a metal, such as copper, nickel, or silver, by plating, for example. One example of conductive cloth that provides the detection electrode 75 is a sheet of woven fabric into which conductive fibers, such as stainless steel wires, carbon fibers, or plated fibers, are woven as needed. For example, a woven fabric into which conductive fibers, such as stainless steel wires, are woven at intervals of about 1 to 10 mm is used to provide a detection electrode having excellent durability and economical efficiency. The use of the conductive cloth for the detection electrode 75 makes it possible to design the detection electrode as desired, i.e., determine the shape and dimensions of the detection electrode as desired, and permits the detection electrode to be formed integrally with the surface material that forms other portions of the seat. Also, the detection electrode in the form of the conductive cloth does not reduce the breathability of the seat, nor does impair the texture of the seat.

In the occupant detection system of this invention, at least one detection electrode 75 may be provided. While the detection electrodes may be provided in the seat bottom and the seatback, it is preferable to provide the detection electrode(s) in at least the seat bottom 71. The shape and dimensions of the detection electrode 75 are not particularly limited, but may be determined so as to match the size and shape of the seat bottom or seatback of the seat, or one or more electrodes may be provided only in portions of the seat with which the body of the occupant comes into contact when he/she is seated. The detection electrode may consist of a plurality of electrodes that are arranged in a pattern and electrically connected to each other. A lead wire is drawn from the detection electrode 75, and the detection electrode 75 is connected to the ECU 2, via an electric conductor (e.g., shielded cable) 23. Where the seat frame 76 is made of metal, the seat frame 76 that function as a ground electrode is connected to the ECU 2 via an electric conductor (e.g., a shield-side conductor of a shielded cable), and the potential of the seat frame 76 is referred to as "reference potential".

Figure 2:
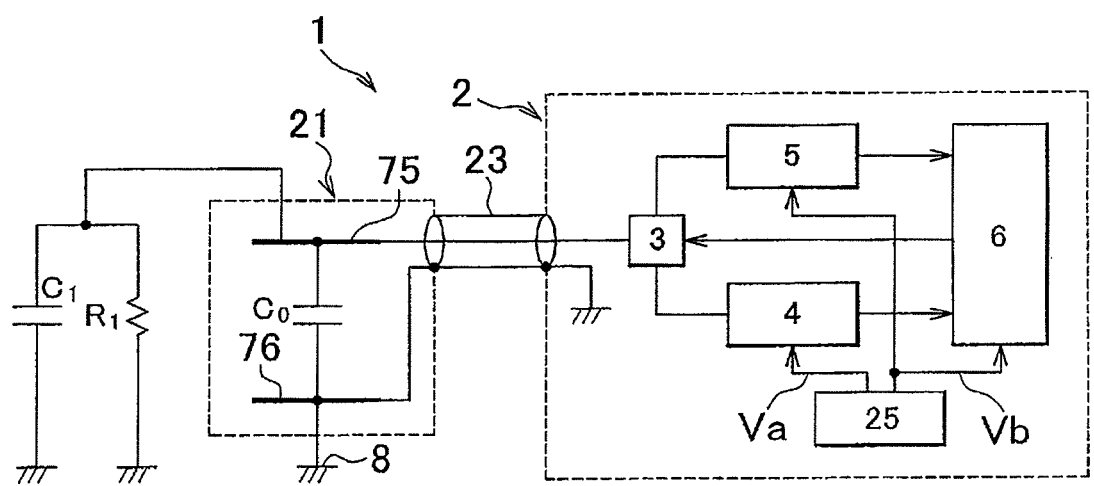
FIG. 2 is a block diagram showing the configuration of the occupant detection, system of the invention.

FIG. 2 is a block diagram showing the configuration of the occupant detection system 1. FIG. 2 is an equivalent circuit diagram of the seat and an object on the seat, including a sensor portion 21 having the detection electrode 75 and the ground electrode 76, and C0, C1, R1. C0 represents capacitance that arises between the detection electrode 75 and the ground electrode 76 irrespective of whether an occupant is seated or not, and the capacitance C0 is developed by the seat and its surroundings, as well as the cushioning in the seat. When an occupant sits in the seat, the capacitance C0 may increase due to deformation of the seat, for example, as compared with the case where no occupant is seated. C1 and R1 constitute an equivalent circuit of an object, such as a human body, on the seat. When an occupant 9 is present in the seat, the body of the occupant is interposed between the detection electrode 75 and the ground. The human body is a dielectric, and has a larger dielectric constant than air; therefore, the capacitance C1 derived from the human body arises between the detection electrode 75 and the ground electrode 76, and the total capacitance between the electrodes increases significantly as compared with the case where no occupant is seated. In the meantime, the impedance around the detection electrode changes due to a disturbance factor, such as contact of the seat with water. In some cases, leakage current appears between the detection electrode 75 and the vehicle body via resistance R1. The leakage current increases when the seat gets wet.

The detection electrode 75 and ground electrode 76 provided in the sensor portion 21 are connected to the ECU 2 via the cable 23. The ECU 2 includes a power circuit 25, a phase difference measuring unit 4, a direct current measuring unit 5, and a detecting unit 6. The phase difference measuring unit 4 and the direct current measuring current 5 are connected to the detection electrode 75 via a coupling unit 3. The power circuit 25 produces DC power (such as voltages Va, Vb) supplied to each electronic circuit of the ECU 2, from power (such as a voltage of 12V) supplied from the battery of the vehicle. The outputs of the power circuit 25 may include Va that is equal to 8V, and Vb that is equal to 5V, for example.

Figure 3:
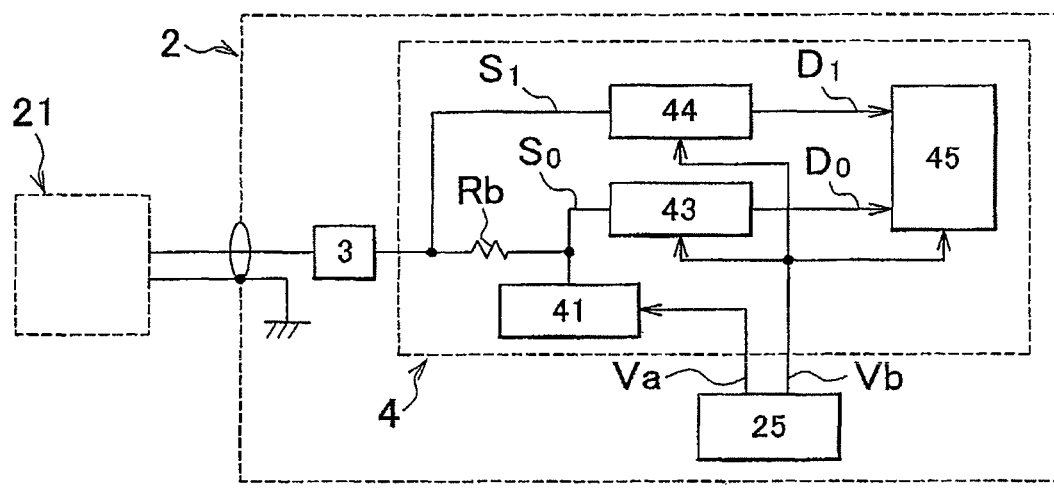
FIG. 3 is a block diagram mainly showing the configuration of a phase difference measuring unit of the occupant detection system of the invention.

FIG. 3 is a block diagram showing the configuration of the phase difference measuring unit 4. The phase difference measuring unit 4 includes an oscillator circuit 41, a resistive element Rb, two comparator circuits 43, 44, and a control unit 45. In the following description of the phase difference measuring unit 4, it is assumed that the circuits that constitute the phase difference measuring unit 4 are electrically connected to the detection electrode 75 provided in the sensor portion 21, via the coupling unit 3. The oscillator circuit 41 is connected to the detection electrode 75 via the resistance element Rb connected in series therebetween, and is adapted to output a reference signal $S_0$. The reference signal $S_0$ is a signal comprising a sinusoidal wave having a fixed frequency, and is formed by superimposing a given DC voltage (bias) on the sinusoidal wave. The bias value may be 0V. The DC bias value and the amplitude of the sinusoidal wave may be appropriately determined. For example, the oscillator circuit 41 may be arranged to use the above-indicated Va (8V) as power supplied, and generate a reference signal in the form of a sinusoidal wave having an amplitude of 1-4V, to which a bias of 4V is provided. The frequency of the sinusoidal wave included in the reference signal $S_0$ may be a fixed frequency within the range of several dozens of kHz to several hundreds of kHz. Preferably, the frequency may be within the range of 70 kHz to 200 kHz.

The reference signal $S_0$ generated from the oscillator circuit 41 is fed to the first comparator circuit 43. The comparator circuit 43 is configured to produce a digital reference phase signal $D_0$, by comparing the reference signal $S_0$ with a predetermined threshold value ($Vr_0$). The threshold value $Vr_0$ may be equal to the reference level of the sinusoidal wave included in the reference signal $S_0$, i.e., may be equal to the above-mentioned bias value. The reference phase signal $D_0$ produced by the comparator circuit 43 is fed to the control unit 45. Also, the detection electrode 75 is connected to the second comparator circuit 44. The comparator circuit 44 is configured to produce a digital electrode phase signal $D_1$, by comparing the potential of the detection electrode 75, i.e., a signal (electrode signal) $S_1$ of voltage developed between the ground electrode 76 and the detection electrode 75, with a threshold value ($Vr_1$). The electrode signal $S_1$ is a signal comprising a sinusoidal wave of the same frequency as that of the reference signal $S_0$ supplied to the detection electrode 75. The electrode phase signal $D_1$ produced by the comparator circuit 44 is fed to the control unit 45. The control unit 45 may consist of a microcontroller, or the like, as will be described later, and include a means for measuring a delay or lag (phase lag time ($T_A$)) in the timing of the electrode phase signal $D_1$ relative to the reference phase signal $D_0$.

Figure 4:
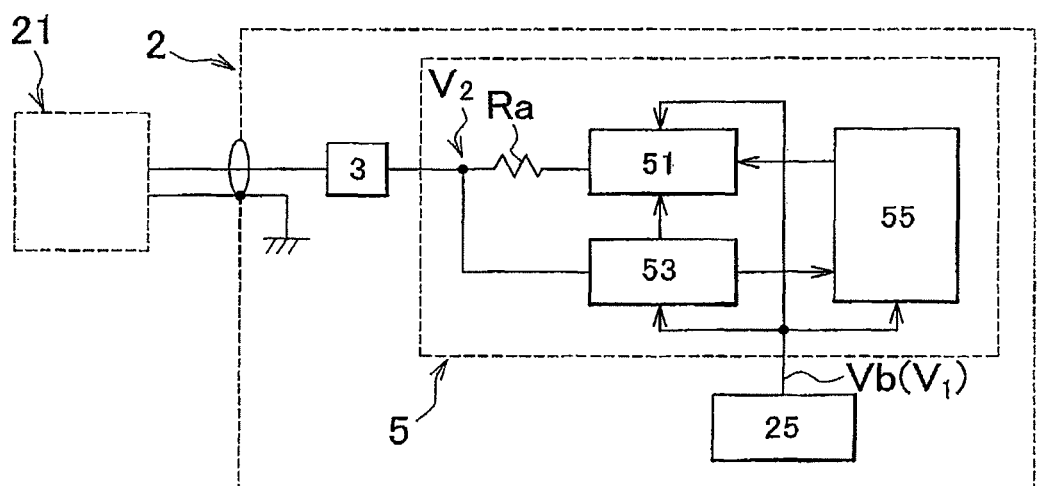
FIG. 4 is a block diagram mainly showing the configuration of a direct current measuring unit of the occupant detection system of the invention.

FIG. 4 is a block diagram showing the configuration of the direct current measuring unit 5. The direct current measuring unit 5 includes a voltage application circuit 51, a potential detection circuit 53, and a control unit 55. In the following description of the direct current measuring unit 5, it is assumed that the circuits that constitute the direct current measuring unit 5 are electrically connected to the detection electrode 75 provided in the sensor portion 21, via the coupling unit 3. The voltage application circuit 51 and the potential detection circuit 53 are connected to the detection electrode 75. The voltage application circuit 51 is configured to apply a DC voltage $V_1$ to the detection electrode 75 via a resistive element Ra. The DC voltage $V_1$ is a given voltage produced by the power circuit 25, and may be equal to the above-indicated voltage Va (8V) or Vb (5V). Also, the voltage application circuit 51 may be arranged to keep the detection electrode 75 at the same potential as that of the ground electrode 76 except for the duration in which the DC voltage is applied to the detection electrode 75. The potential detection circuit 53 is configured to detect that the potential of the detection electrode 75, namely, the voltage $V_2$ between the ground electrode 76 and the detection electrode 75, reaches a predetermined threshold voltage. The voltage application circuit 51 and the potential detection circuit 53 are connected to the control unit 55. The control unit 55 includes a means for controlling application of the DC voltage to the detection electrode 75 by the voltage application circuit 51, and measuring time (charge time ($T_C$)) it takes for the potential detection circuit 53 to detect the voltage $V_2$ that has reached the threshold voltage, as counted from the time when the application of the DC voltage is started. The control unit may consist of a microcontroller, or the like, as will be described later.

Figure 5:
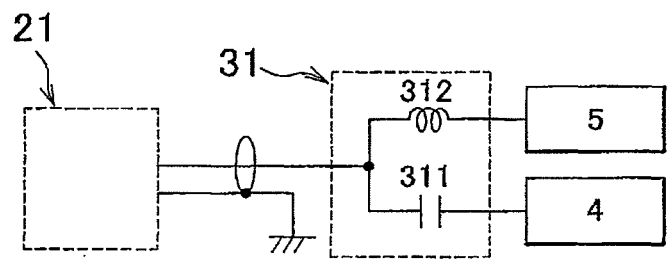
FIG. 5 is a block diagram showing the configuration of a coupling unit of the occupant detection system of the invention.

The coupling unit 3 is a circuit for connecting the circuits that constitute the phase difference measuring unit 4 and the circuits that constitute the direct current measuring unit 5 with the detection electrode 75. The configuration of the coupling unit 3 is not particularly limited, but the coupling unit 3 may be in the form of a coupling circuit 31 that connects the detection electrode 75 with the phase difference measuring unit 4 via a capacitor 311, and connects the detection electrode 75 with the direct current measuring unit 5 via a coil 312, as shown in FIG. 5. Also, the coupling unit 3 may be in the form of a switching circuit 32 that connects one of the phase difference measuring unit 4 and the direct current measuring unit 5 with the detection electrode 75 as shown in FIG. 6, and the switching circuit 32 may be configured such that one of the measuring units 4, 5 can be selected by the detecting unit 6.

The detecting unit 6 is configured to obtain the phase lag time $T_A$ measured by the phase difference measuring unit 4, and the charge time $T_C$ measured by the direct current measuring unit 5, and determine the presence of an occupant in the seat, based on the obtained phase lag time $T_A$ and charge time $T_C$. The detecting unit 6, the control unit 45 of the phase difference measuring unit 4, and the control unit 55 of the direct current measuring unit 5 may be provided by a single microcontroller (such as a microcomputer adapted for incorporation) and its surrounding circuit. The microcontroller stores parameters used when determining the presence of an occupant in the seat, and includes programs for performing or making measurements, controls, setting of threshold values, and determinations, for example. The microcontroller may also include input/output interfaces for transmitting measurement values and determination results to the outside, such as an air-bag system.

Next, the operations of the occupant detection system will be described. FIG. 7A to FIG. 7D are timing charts useful for explaining measuring operations of the occupant detection system. FIG. 7A represents the reference signal $S_0$ generated by the oscillator circuit 41. In this embodiment, the reference signal $S_0$ is in the form of a sinusoidal wave to which a bias of about one half of the power supply voltage Va is given. The reference signal $S_0$ is supplied to the detection electrode 75 via the resistive element Rb. The reference signal $S_0$ is also supplied to the comparator circuit 43. FIG. 7B represents the potential of the detection electrode 75, or the electrode signal $S_1$. The sinusoidal wave of the electrode signal $S_1$ has a different phase from that of the reference signal $S_0$, due to the capacitance between the ground electrode 76 and the detection electrode 75. The signal levels (the maximum value, the minimum value) of the electrode signal $S_1$ may be set by setting the value (resistance) of the resistive element Rb. The electrode signal $S_1$ is fed to the comparator circuit 44.

FIG. 7C represents the reference phase signal $D_0$ produced by comparing the reference signal $S_0$ with the threshold value $Vr_0$, in the first comparator circuit 43. In the example shown in FIG. 7, the reference phase signal $D_0$ becomes equal to logical "1" when the reference signal $S_0$ exceeds the threshold value $Vr_0$. The threshold value $Vr_0$ may be set to any value within the range between the maximum value and minimum value of the reference signal $S_0$. Preferably, the threshold value $Vr_0$ is set to a substantially middle level, i.e., the reference level of the sinusoidal waveform included in the reference signal $S_0$. In this manner, the reference phase signal $D_0$ that rises from "0" to "1" at point $p_{00}$ corresponding to the phase 0° of the sinusoidal waveform and falls from "1" to "0" at point $p_{01}$ corresponding to the phase 180° is produced. FIG. 7D represents the electrode phase signal $D_1$ produced by comparing the electrode signal $S_1$ with the threshold value $Vr_1$, in the second comparator circuit 44. In the example of FIG. 7D, the electrode phase signal $D_1$ becomes equal to logical "1" when the electrode signal $S_1$ exceeds the threshold value $Vr_1$. The threshold value $Vr_1$ is set so that the phases ($p_{10}$, $p_{11}$) at which the electrode signal $S_1$ passes the horizontal line of the threshold value $Vr_1$ are substantially equal to the phases at which the reference signal $S_0$ passes the line of the threshold value $Vr_0$. In this embodiment, the phases ($p_{00}$, $p_{01}$) at which the reference signal $S_0$ passes the horizontal line of the threshold value $Vr_0$ are 0° and 180°; therefore, the threshold value $Vr_1$ is set so that the horizontal line representing the threshold value $Vr_1$ passes points ($p_{10}$, $p_{11}$) at which the phase of the sinusoidal waveform included in the electrode signal $S_1$ becomes equal to 0° and 180°. Thus, the electrode phase signal $D_1$ that rises from "0" to "1" at point $p_{10}$ corresponding to the phase 0° of the electrode signal $S_1$ and falls from "1" to "0" at point $p_{11}$ corresponding to the phase 180° is produced.

The phase of the electrode signal $S_1$ is delayed from the phase of the reference signal $S_0$, due to the presence of the capacitance (C0+C1) between the detection electrode and the ground electrode. Therefore, the points in time at which the electrode phase signal $D_1$ rises and falls are delayed from the points in time at which the reference phase signal $D_0$ rises and falls. In FIG. 3A to FIG. 3D, a delay (in time) of a rise of the electrode phase signal $D_1$ relative to a rise of the reference phase signal $D_0$ is denoted as "rise delay time Tu", and a delay (in time) of a fall of the electrode phase signal $D_1$ relative to a fall of the reference phase signal $D_0$ is denoted as "fall delay time Td". Also, Ta represents the sum of the rise delay time Tu and the fall delay time Td. The rise delay time Tu and the fall delay time Td are substantially equal to each other in a situation where there is no disturbance factor like the seat being wet. In order to detect a seated occupant, for example, the rise delay time Tu, the fall delay time Td, or the sum Ta of Tu and Td may be used as phase lag time $T_A$. Also, information about a seated occupant, contact of the seat with water, or the like, may be obtained from a combination of Tu, Td and Ta.

When an AC voltage of frequency f is supplied to a simple series circuit of capacitance C and resistance R, a phase delay $\phi$ of voltage derived from the capacitance C to the supplied voltage is calculated as $\phi=(\pi/2)-\tan^{-1}(1/(2\pi fCR))$. Namely, the phase delay $\phi$ increases as the capacitance C increases. In one embodiment of the occupant detection system, where the phase difference of the electrode signal $S_1$ relative to the reference signal $S_0$ is measured as delay time (Ta), the delay time Ta and the capacitance C has a relationship as indicated in the graph of FIG. 8. Thus, the presence or absence of a seated occupant can be determined by comparing the measured delay time Ta with a predetermined threshold value Th.

Figure 10:
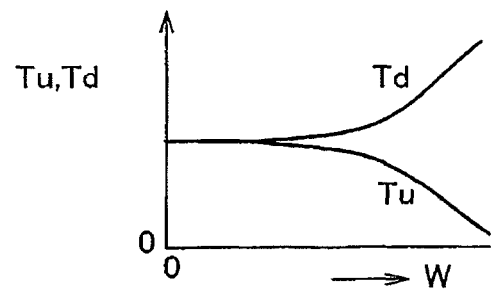
FIG. 10 is a graph indicating the relationships between the amount of water under which the seat is wet, and the rise delay time and the fall delay time.

However, when the detection electrode 75 provided at the seat surface or immediately below the seat surface is in a wet condition, for example, the impedance around the detection electrode or between the detection electrode and the ground electrode changes. Also, leakage current increases, resulting in a reduction of the level of the electrode signal $S_1$ and a reduction of the amplitude of the sinusoidal waveform. FIG. 9A to FIG. 9D show changes in the level of each signal in a condition where there is a disturbance factor, such as wetting of the detection electrode. In this condition, if the electrode signal $S_1$ is digitized using the same threshold value $Vr_1$ as that indicated in FIG. 7B, the timing of rise and fall of the electrode phase signal $D_1$ changes as shown in FIG. 7D. As a result, the rise delay time Tu decreases and the fall delay time Td increases, from those obtained in a condition where the seat is not wet, as shown in FIG. 7A to FIG. 7D. If the conductive cloth is used as the detection electrode 7, and the electrode portion gets wet, the rise delay time Tu and the fall delay time Td change as shown in FIG. 10, according to the amount W of water under which the seat is wet. Accordingly, the degree of wetness of the detection electrode portion of the seat can be determined from the amount of changes in the delay times Tu and Td.

Figure 11:
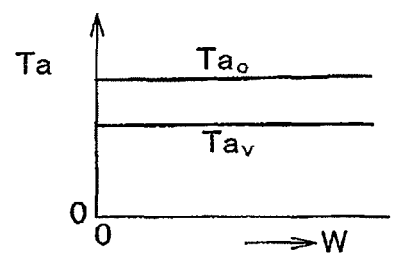
FIG. 11 is a graph indicating the relationship between the amount of water under which the seat is wet, and the sum of the rise delay time and the fall delay time.

As shown in FIG. 10, in a condition where the seat is wet, the rise delay time Tu and the fall delay time Td change so as to substantially cancel each other out. Namely, it is found that the sum Ta of the rise delay time Tu and the fall delay time Td is almost constant, irrespective of whether the seat is wet or not, and irrespective of the degree of wetness of the seat. FIG. 11 shows the relationship between the sum Ta of the above-indicated delay times and the amount of water W under which the seat is wet. In FIG. 11, the vertical axis indicates time, and $Ta_V$ is the above-indicated sum of delay times obtained when no occupant is present in the seat (i.e., the seat is vacant), while $Ta_O$ is the sum of delay times obtained when an occupant is present in the seat. It will be understood that the sum Ta of delay times differs significantly depending on whether an occupant is seated or not, but does not change largely according to the amount of water W under which the seat is wet. Thus, the rise delay time Tu and the fall delay time Td are measured, and value Ta is obtained by adding Tu and Td together, so that it can be determined whether an occupant is present in the seat, irrespective of a wet condition of the seat, based on the thus obtained Ta.

Figure 12:
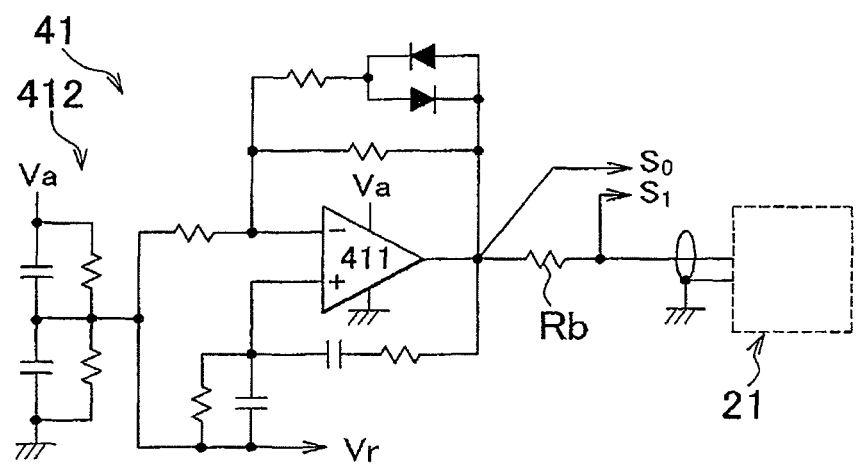
FIG. 12 is a circuit diagram showing an example of an oscillator circuit included in the phase difference measuring unit.

The above-described operation and effect may be achieved by a further simpler arrangement. FIG. 12 shows a specific example of the oscillator circuit 41 using a known oscillator circuit. In this example, an oscillation frequency may be set to about 70 kHz, for example. The DC bias voltage (Vr) is generated by a potential divider 412. The reference signal $S_0$ produced by the oscillator circuit is transmitted to the detection electrode 75, via the series resistance Rb. FIG. 13 shows specific examples of two comparator circuits 43 and 44. A comparator 431 that constitutes the first comparator circuit compares the reference signal $S_0$ generated from the oscillator circuit 41, with the DC voltage Vr produced by the potential divider 412, so as to produce a reference phase signal $D_0$, and sends the reference phase signal $D_0$ to the control circuit 6. A comparator 441 that constitutes the second comparator circuit compares the electrode signal $S_1$ generated at the detection electrode, with the DC voltage Vr produced by the potential divider 412, so as to produce an electrode phase signal $D_1$, and sends the electrode phase signal $D_1$ to the control circuit 6. The delay times Tu and Td of the electrode phase signal $D_1$ relative to the reference phase signal $D_0$ may be measured by the control circuit 6.

Figure 15A:
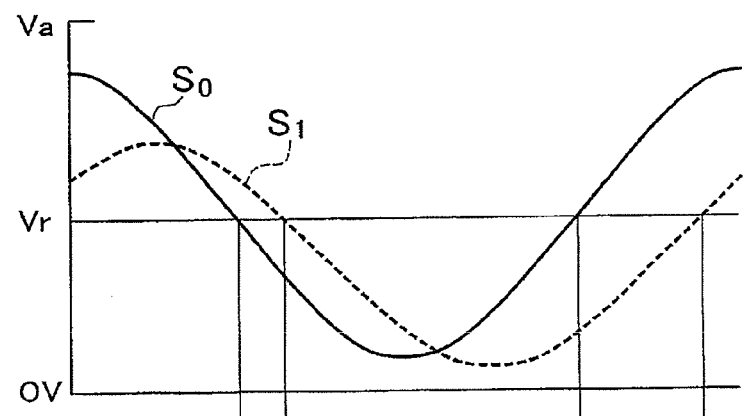
FIG. 15A and FIG. 15B are timing charts useful for explaining the operation of the phase difference measuring unit in the case as shown in FIG. 14A and FIG. 14B, in a condition where there is a disturbance, such as wetting of the seat.
Figure 15B:
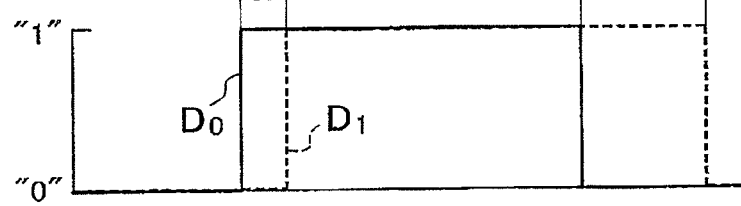

FIG. 14A and FIG. 14B are timing charts showing each signal obtained when the above-described circuits are used, in a normal condition where the seat is not wet, for example. By appropriately selecting the resistance value of the resistive element Rb, the levels (the maximum value and the minimum value) of the electrode signal $S_1$ may be made substantially equal to those of the reference signal $S_0$, as shown in FIG. 14A. As a result, the threshold value ($Vr_0$) used when creating the reference phase signal $D_0$ from the reference signal $S_0$ and the threshold value ($Vr_1$) used when creating the electrode phase signal $D_1$ from the electrode signal $S_1$ can be made equal to the same value Vr, and the oscillator and comparators can be provided by an extremely simple circuit. FIG. 15A and FIG. 15B are timing charts showing each signal obtained in a condition where there is a disturbance factor, such as a wet condition of the detection electrode portion. The levels (the maximum value and the minimum value) of the electrode signal $S_1$ are reduced due to the wet condition, for example. As a result, when the electrode signal $S_1$ is digitized using the predetermined threshold value Vr, the delay times Tu and Td of the electrode phase signal $D_1$ relative to the reference phase signal $D_0$ change from those in the condition as shown in FIG. 14A and FIG. 14B. Similarly to the case as described above, it is possible to determine the degree of wetness of the seat and the presence of a seated occupant, based on the delay times Tu, Td and the sum Ta of Tu and Td.

Figure 16A:
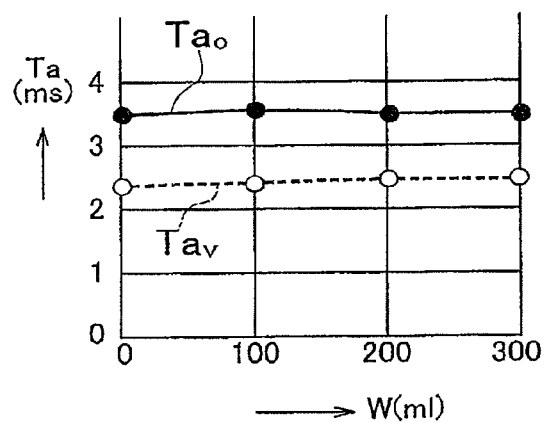
FIG. 16A and FIG. 16B show graphs indicating the relationship between the amount of water under which the seat is wet, and the sum of the rise delay time and fall delay time measured immediately after the seat gets wet, and the relationship between the amount of water and the sum of the rise delay time and fall delay time measured after a lapse of a certain time from the time when the seat gets wet.
Figure 16B:
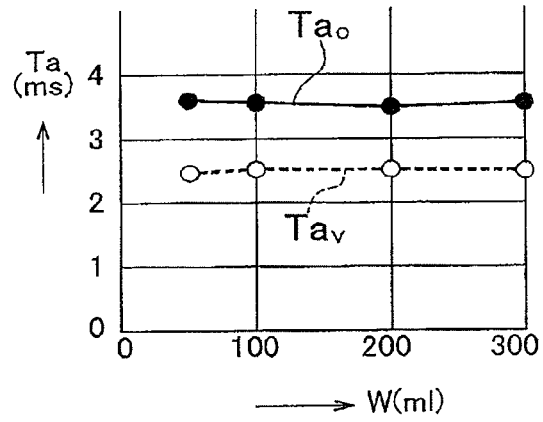

FIGS. 16A, 16B are concerned with one example of phase difference measuring method of the invention. In this example, a conductive cloth serving as a detection electrode 75 was provided on a surface of the seat bottom of the seat. The size of the conductive cloth is 30 cm×40 cm, and stainless steel fibers are woven into the fabric at regular intervals of 5 mm. The conductive cloth was uniformly sprayed with water, to be brought into a wet condition, and the amount of water thus sprayed was indicated as the amount W (in ml) of water applied. The oscillator circuit and comparator circuits used in this example were those as shown in FIG. 12 and FIG. 13, and the frequency of the reference signal was 70 kHz, while the resistance of the resistive element Rb was 22 kΩ. FIG. 16A and FIG. 16B show the relationship between the sum Ta (in ms) of the rise delay time and the fall delay time, and the applied water amount W. In FIG. 16A and FIG. 16B, the broken line ($Ta_F$) indicates the sum of the delay times when no occupant is present in the seat, and the solid line ($Ta_O$) indicates the sum of the delay times when an occupant is present in the seat. FIG. 16A indicates measurement values obtained immediately after the seat gets wet, and FIG. 16B indicates measurement values obtained after a lapse of 10 min. from the time when the seat gets wet. It will be understood from the results that the sum Ta of the rise delay time and the fall delay time is almost constant irrespective of the applied water amount, even with a lapse of time, and therefore, the presence of an occupant in the seat can be stably or reliably determined from the sum Ta.

Figure 17:
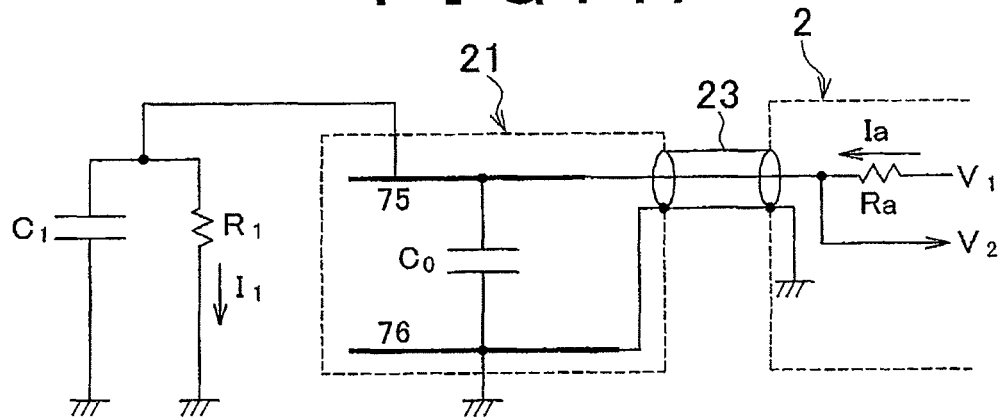
FIG. 17 is a circuit diagram useful for explaining an equivalent circuit of the seat and an object on the seat, and a DC voltage supplied from the direct current measuring unit of the occupant detection system of the invention, and the measured potential of the detection electrode.
Figure 18:
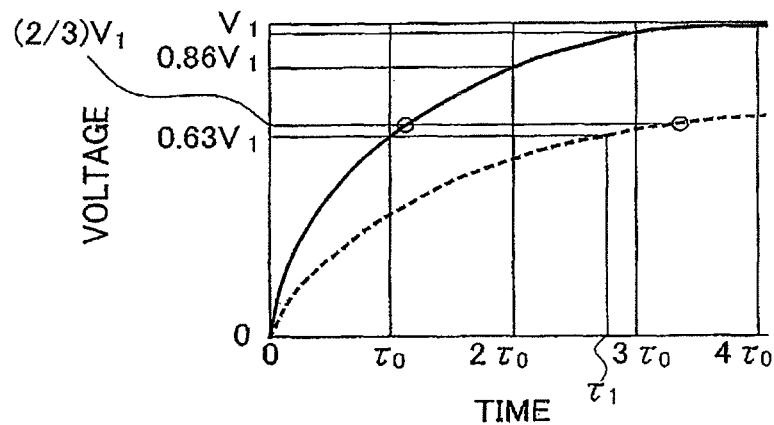
FIG. 18 is a graph indicating changes in the voltage of the detection electrode measured by the direct current measuring unit of the occupant detection system with time.

Next, a measuring operation of the occupant detection system according to the direct current measuring method will be described. FIG. 17 is an equivalent circuit diagram of the seat having the sensor portion 21, its surroundings, and an object, such as a human body, on the seat. $C_0$ represents capacitance between the detection electrode 75 and the ground electrode 76, which is caused by the cushion material of the seat. $C_1$ and $R_1$ represent capacitance and resistance caused by a seated occupant. Ra is a resistive element provided in the voltage application circuit 51 for restricting current. In operation, the voltage application circuit 51 applies a DC voltage $V_1$ to the detection electrode 75 via the resistive element Ra. The potential of the detection electrode 75, i.e., the voltage between the ground electrode 76 and the detection electrode 75 is denoted as $V_2$. If the DC voltage $V_1$ is applied via the resistance Ra to the detection electrode 75 when it is in an initial condition in which the potential of the detection electrode 75 is equal to that of the ground electrode 76, current Ia flows, and electrical charge starts being accumulated between the detection electrode 75 and the ground electrode 76. When no occupant is seated in the seat, the capacitance between the electrodes is equal to $C_0$. In this case, the voltage $V_2$ increases with time as indicated by the solid line in FIG. 18, and the voltage $V_2$ becomes equal to $0.63V_1$ at time $\tau_0$, where $\tau_0$ is a time constant ($\tau_0 = Ra \cdot C_0$). When an occupant is seated in the seat, the capacitance between the detection electrode 75 and the ground electrode 76 becomes equal to ($C_0+C_1$) since the body 9 of the occupant is present between the detection electrode and ground. In this condition, if the DC voltage $V_1$ is applied to the detection electrode 75 via the resistance Ra, charge is accumulated between the electrodes, and the voltage $V_2$ between the electrodes increase as indicated by the broken line in FIG. 18. In this case, the time constant $\tau_1$ is expressed as $\tau_1 = Ra \cdot (C_0+C_1)$.

In the direct current measuring method, a change in the capacitance is detected by measuring time (charge time $T_C$ it takes for the voltage $V_2$ to reach a predetermined threshold voltage. If the predetermined threshold voltage is $0.63V_1$, for example, the charge time obtained when no occupant is seated is $\tau_0$, and the charge time obtained when an occupant is seated is $\tau_1$. The total value of the actual capacitances $C_0$, $C_1$ varies depending on the vehicle type. In an example of actual measurements on a compact car, the capacitance $C_0$ obtained when no occupant is seated is about 50 pF, and the capacitance ($C_0+C_1$) obtained when an adult is seated in the seat is about 150 pF. In this case, if the resistance Ra is equal to 500 kΩ, $\tau_0$ becomes equal to about 25 μs, and $\tau_1$ becomes equal to about 75 μs. Thus, there is a significant difference in the charge time between the case where no occupant is seated and the case where an occupant is seated; therefore, a seated occupant can be detected with reliability. In the case where a child seat, a baggage, or the like is placed on the seat, it is easy to discriminate this case from the case where a human body is present in the seat since the dielectric constant or relative permittivity of the child seat or baggage is normally smaller than that of the human body.

Figure 19:
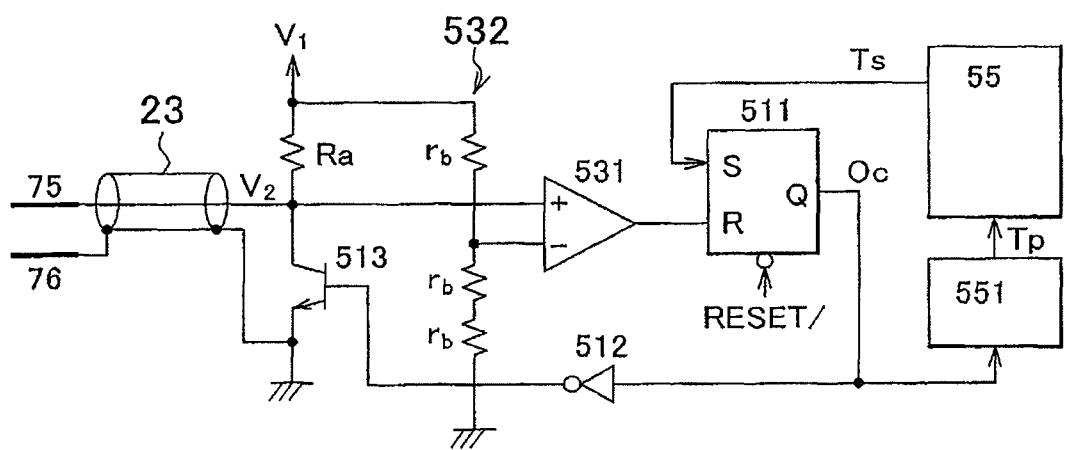
FIG. 19 is a circuit diagram showing an example of direct current measuring unit of the occupant detection system.

FIG. 19 is a specific example of circuit configuration of the voltage application circuit 51 and the potential detection circuit 53. The voltage application circuit 51 consists of a flip-flop 511, switching device (e.g., transistor) 513, resistance Ra, and so forth. A signal Ts received by an S terminal of the flip-flop 511 is a start signal that is generated from the control unit 55 as a command to start application of voltage. The potential detection circuit 53 includes a potential divider 532 for setting a threshold voltage, and a comparator 531 that compares the above-mentioned voltage $V_2$ with the threshold voltage. In this example, the threshold voltage is equal to $(\frac{2}{3})V_1$. The output signal of the comparator 531 is fed to an R terminal of the flip-flop 511 of the voltage application circuit 51. The operation of the circuit as shown in FIG. 19 is as follows. In the initial condition, the output signal $0c$ of the flip-flop 511 is reset to OFF, and the switching device 513 is placed in an ON state; therefore, the potential of the detection electrode 75 is equal to that of the ground electrode 76. If the start signal Ts is received from the control unit 55, the output signal $0c$ of the flip-flop 511 is set to ON, and the switching device 513 is turned OFF. As a result, the DC voltage $V_1$ is applied to the detection electrode 75 via the resistance Ra, and electrical charge starts being accumulated between the detection electrode 75 and the ground electrode 76, resulting in an increase of the voltage $V_2$. When the voltage $V_2$ of the detection electrode 75 exceeds the threshold voltage $(\frac{2}{3})V_1$, the comparator 531 generates an ON signal, and the output signal $0c$ of the flip-flop 511 is reset to OFF, whereby the switching device 513 is turned ON. As a result, the charge accumulated between the electrodes is released or discharged, and the circuit of FIG. 19 returns to the above-described initial condition.

The charge time $T_C$ from the time when electrical charge starts being accumulated between the detection electrode 75 and the ground electrode 76 to the time when the voltage $V_2$ of the detection electrode 75 reaches the predetermined threshold voltage is a period of time for which the output signal $0c$ of the flip-flop 511 is set (ON), as measured from the time when the flip-flop 511 receives the start signal Ts from the control unit 55. The charge time $T_C$ can be easily measured through the use of an oscillator circuit 551, for example. The oscillator circuit 551 is configured to output a pulse signal Tp of a fixed period while the above-indicated output signal $0c$ is ON, and the control unit 55 can measure the charge time by counting the number of pulses of the pulse signal Tp. The period of the pulse signal Tp may be determined as appropriate, according to the required resolution.

Figure 20:
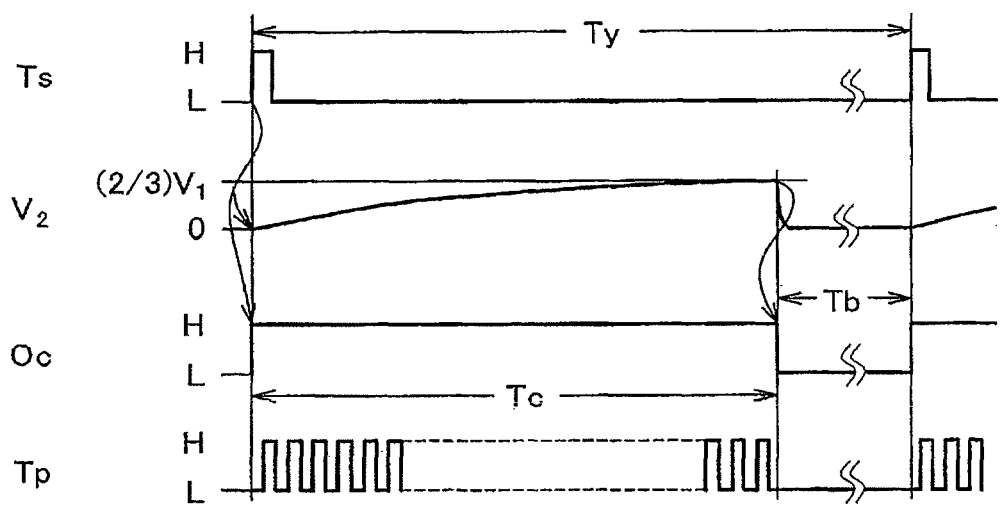
FIG. 20 is a timing chart showing a measuring operation performed by the circuit as shown in FIG. 19.

FIG. 20 is a time chart showing an example of measuring operation using the above-described circuit. Before the start signal Ts is fed to the flip-flop 511, the detection electrode is at the same potential ($V_2=0V$) as ground. When the start signal Ts is generated (H), the DC voltage $V_1$ is applied to the detection electrode via the resistive element Ra, so that electrical charge starts being accumulated between the detection electrode and ground, and the voltage $V_2$ increases with time. Upon generation of the start signal Ts, the output signal $0c$ of the potential detection circuit is set to ON (H), and the pulse signal Tp is generated from the oscillator circuit 551. When the potential $V_2$ of the detection electrode reaches a predetermined threshold voltage ($(\frac{2}{3})V_1$ in this example), the output signal 0c of the potential detection circuit is reset to OFF (L), and the pulse signal Tp stops being generated. The charge time $T_C$ can be determined by counting the number of pulses of the pulse signal Tp. The control unit 55 periodically and repeatedly measures the charge time $T_C$, so as to be aware of changes in the capacitance between the detection electrode and ground. In the example of FIG. 20, the start signal Ts is generated at intervals of Ty. The interval Ty of the measurement may be determined as appropriate, for example, may be set to several dozens to several hundreds of milliseconds (ms).

Figure 21:
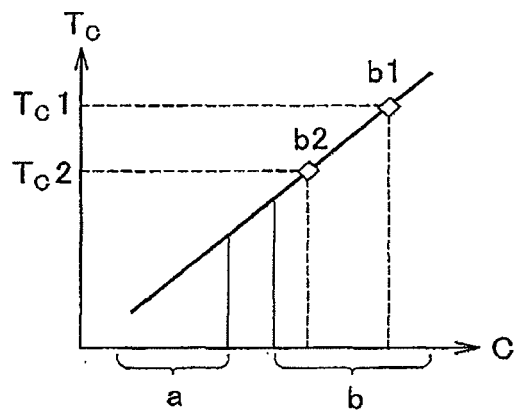
FIG. 21 is a graph indicating the relationship between the capacitance between the electrodes, and the charge time measured by the direct current measuring unit of the occupant detection system.

The capacitances measured when the seat is empty (i.e., no occupant is present in the seat) and when an occupant is present in the seat differ or vary largely depending on the type of the vehicle. In this embodiment, where the detection electrode is provided in the seat bottom of the seat, the capacitance measured when the seat is empty is about 50 pF in a compact passenger car, and is about one hundred and several dozens of pF in a large passenger car. When an adult is seated in the seat, however, the capacitance becomes about three times as large as that obtained when the seat is empty; therefore, the charge time $T_C$ measured when an occupant is seated becomes about three times as long as the charge time $T_C$ measured when the seat is empty. As shown in FIG. 21, the charge time $T_C$ is generally proportional to the value of the capacitance C between the detection electrode 75 and the ground electrode 76. As is understood from FIG. 21, the capacitance significantly differs between the case (a) where no occupant is seated and the case (b) where an occupant is seated, and also differs depending on the body size or shape of the seated occupant. For example, the capacitance differs between the case (b1) where the seated occupant is an adult and the case (b2) where the seated occupant is a child. Accordingly, it is possible to determine the presence of an occupant in the seat, a seating condition or posture of the seated occupant, and the body size or shape of the occupant, by measuring the charge time $T_C$. Furthermore, when the detection electrode is provided in the seat bottom portion of the seat, the system is less likely to be influenced by the seating posture of the occupant; thus, stable measurement values can be obtained even when the occupant sits in a forward leaning position, for example.

Figure 22:
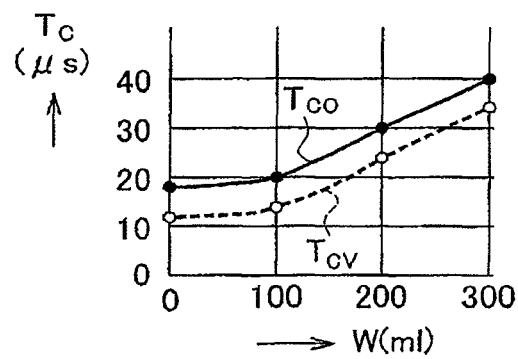
FIG. 22 is a graph showing changes in the charge time with the amount of water under which the seat is wet, when the seat is empty and when an occupant is present in the seat.

However, when the seat gets wet under water, for example, the charge time $T_C$ increases as the amount W of water under which the seat is wet increases, as shown in FIG. 22 by way of example. In FIG. 22, the broken line $T_{CV}$ indicates the case where the seat is empty (i.e., no occupant is present in the seat), and the solid line $T_{CO}$ indicates the case where an occupant is present in the seat. In this example, the detection electrode is in the form of a conductive cloth provided in the surface of the seat bottom portion of the seat. The size of the conductive cloth is 30 cm×40 cm, and the conductive cloth is formed by weaving stainless steel fibers into a sheet of fabric at intervals of 5 mm. The conductive cloth is uniformly sprayed with water, to be brought into a wet condition, and the amount of water thus sprayed is denoted as the applied water amount W (in ml).

The characteristics of the phase difference measuring method and the direct current measuring method in the occupant detection system will be summarized. From measurement results obtained by the phase difference measuring method, it is difficult to determine the body size or shape of the seated occupant, since the capacitance between the electrodes and the measurement value Ta are not in a direct proportional relationship (see FIG. 8). However, even in the case where there is a disturbance, such as when the seat is wet, the measurement value Ta corresponds to or varies with the capacitance, without being influenced by the applied water amount W (see FIG. 11, FIG. 16). Also, the measurement values Tu and Td increase or decrease in such directions as to cancel each other as the applied water amount W increases; therefore, the degree of wetness of the detection electrode portion of the seat can be determined from the measurement values Tu, Td (see FIG. 10). On the other hand, the body size or shape of the occupant as well as the presence of the seated occupant can be determined from measurement results obtained by the direct current measuring method, since the capacitance between the electrodes and the measurement value $T_C$ are in a direct proportional relationship (see FIG. 21). However, if the detection electrode portion of the seat gets wet, the measurement value $T_C$ increases in accordance with the applied water amount W (see FIG. 22).

Figure 23:
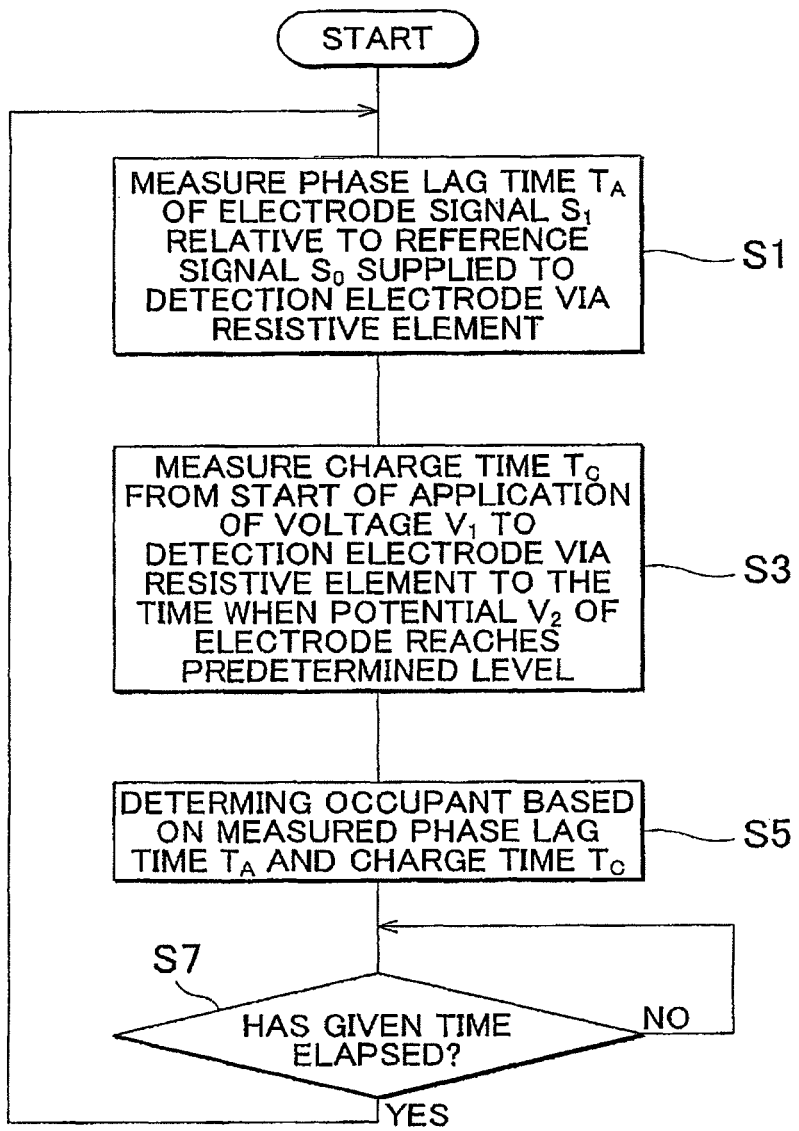
FIG. 23 is a flowchart illustrating an example of occupant detecting method implemented by the occupant detection system of the invention.

The occupant detection system utilizes the above-described relationships, and performs processing (which will be called "occupant detecting method") as indicated in FIG. 23, so as to remove a disturbance factor, such as wetting of the seat, based on the phase lag time $T_A$ (Tu, Td, Ta) measured by the phase difference measuring unit, and detect the body size or shape of the occupant as well as the presence of the occupant in the seat, based on the charge time $T_C$ measured by the direct current measuring unit. The occupant detecting method includes a phase difference measuring step S1, a direct current measuring step S3, and a detecting step S5. The phase difference measuring step S1 is carried out by the phase difference measuring unit, and the direct current measuring step S3 is carried out by the direct current measuring unit, while the detecting step S5 is carried out by the detecting unit. Each of the phase difference measuring step S1 and the direct current measuring step S3 may be executed at appropriate times (for example, at intervals of several hundreds of milliseconds (ms)), or the measuring steps S1, S3 may be executed concurrently.

In the phase difference measuring step S1, the reference signal $S_0$ is supplied to the detection electrode via the resistive element, while the potential of the detection electrode is detected as the electrode signal $S_1$, and the phase lag time $T_A$ of the electrode signal $S_1$ relative to the reference signal $S_0$ is measured. The phase difference measuring step S1 includes a first comparing step of comparing the voltage of the reference signal $S_0$ with a predetermined threshold value so as to produce a binary reference phase signal $D_0$, a second comparing step of comparing the electrode signal $S_1$ with a threshold value, which is a value of the electrode signal at which the phase of the electrode signal $S_1$ is substantially the same as the phase of the reference signal $S_0$ at a point where the signal $S_0$ passes the line of the above-indicated predetermined threshold value, so as to produce a binary electrode phase signal $D_1$ and a measuring step of measuring a delay of a rise of the electrode phase signal $D_1$ relative to a rise of the reference phase signal $D_0$ as a rise delay time Tu, and measuring a delay of a fall of the electrode phase signal $D_1$ relative to a fall of the reference phase signal $D_0$ as a fall delay time Td.

Figure 24:
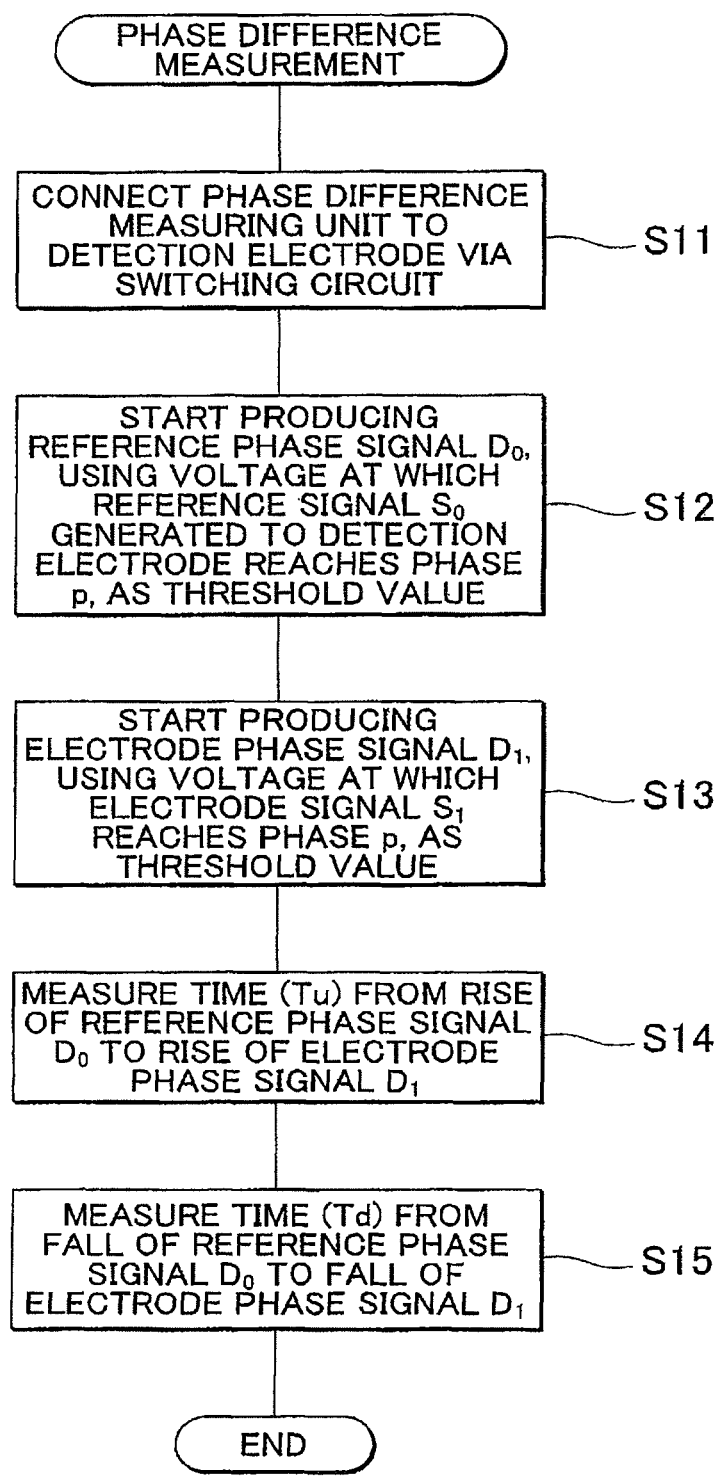
FIG. 24 is a flowchart illustrating an example of measuring method implemented by the phase difference measuring unit.

Initially, where the switching circuit is provided, the phase difference measuring unit is initially connected to the detection electrode via the switching circuit (S11), as shown in FIG. 24. Then, the reference phase signal $D_0$ is produced, using a voltage ($Vr_0$) at which the reference signal $S_0$ generated to the detection electrode side reaches a give phase p, as a threshold value (S12). The phase p corresponds to phases p00, p01 shown in FIG. 7. The reference signal $S_0$ is continuously supplied to the detection electrode, and the reference phase signal $D_0$ is continuously produced. This step S12 corresponds to the first comparing step. In the meantime, the electrode phase signal $D_1$ is produced, using a voltage ($Vr_1$) at which the electrode signal $S_1$ reaches the above-indicated phase p, as a threshold value (S13). The electrode phase signal $D_1$ is continuously produced. This step S13 corresponds to the second comparing step. Then, a length of time from a rise of the reference phase signal $D_0$ produced in the above step to a rise of the electrode phase signal $D_1$ is measured as a rise delay time Tu (S14). Also, a length of time from a fall of the reference phase signal $D_0$ to a fall of the electrode phase signal $D_1$ is measured as a fall delay time Td (S15). These step S14 and step S15 correspond to the measuring step. In the phase difference measuring step S1, the electrode signal $S_1$ may be produced as a signal having substantially the same amplitude as that of the reference signal $S_0$ (see FIG. 14). If the electrode signal $S_1$ and the reference signal $S_0$ have substantially the same amplitude and levels, the threshold values ($Vr_0$ and $Vr_1$) used for producing the reference phase signal $D_0$ and the electrode phase signal $D_1$ may be set to the same value in the first comparing step (S12) and the second comparing step (S13), thus making it possible to adopt an extremely simple method.

Figure 25:
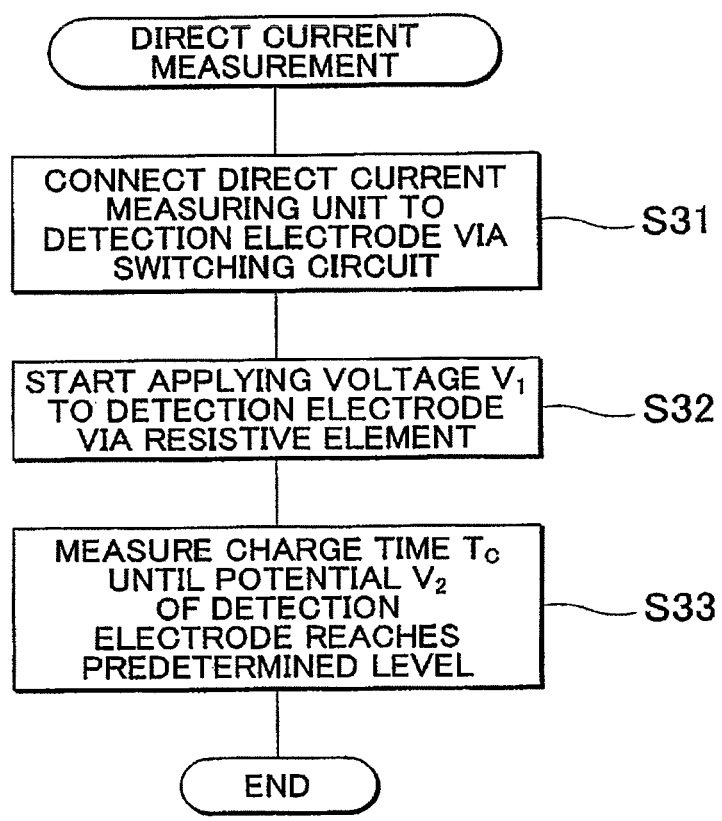
FIG. 25 is a flowchart illustrating an example of measuring method implemented by the direct current measuring unit.

In the direct current measuring step S3, where the switching circuit is provided, the direct current measuring unit is initially connected to the detection electrode via the switching circuit (S31), as shown in FIG. 25. In this step, no electrical charge is present between the detection electrode and ground, i.e., the potential of the detection electrode is equal to 0 ($V_2$=0). Then, a steady DC voltage $V_1$ starts being applied to the detection electrode via the resistive element (S32). Then, the potential $V_2$ of the detection electrode is monitored, and a length of time it takes from the time when the DC voltage $V_1$ is applied to the time when the potential of the detection electrode reaches a predetermined value (e.g., $(\frac{2}{3})V_1$) is measured as the charge time $T_C$ (S33).

In the detecting step S5, an occupant is detected based on the phase lag time $T_A$ measured in the phase difference measuring step S1 and the charge time $T_C$ measured in the direct current measuring step S2. The system may employ various methods for detecting a disturbance, such as a wet condition of the seat, and identifying the occupant. The phase lag time $T_A$ includes the measured rise delay time Tu, fall delay time Td, and the sum of Tu and Td, and one or more of these times may be used for determining the presence of an occupant in the seat, and so forth. When the seat gets wet, for example, the rise delay time Tu decreases and the fall delay time Td increases as the amount of water under which the seat is wet increases, as shown in FIG. 10. Also, as shown in FIG. 22 by way of example, the charge time $T_C$ increases as the amount of water under which the seat is wet increases. Using these relationships, the system can detect an occupant by executing the detecting step as indicated in FIG. 26, for example. Initially, the phase lag time $T_A$ (the rise delay time Tu, fall delay time Td, or the sum of Tu and Td) measured by phase difference measurement is obtained (S51). A difference between the above-indicated Tu and Td may be used as the phase lag time $T_A$. Then, the phase lag time $T_A$ is compared with a predetermined threshold value A (S52). If the phase lag time $T_A$ is smaller than the threshold value A, it is determined that the degree of disturbance, such as the degree of wetness of the seat, is small; therefore, the value of the charge time $T_C$ obtained by direct current measurement can be used as it is as a measurement value T used for detecting an occupant (S53). On the other hand, if the phase lag time $T_A$ is equal to or larger than the threshold value A, it is determined that the degree of disturbance, such as the degree of wetness of the seat, is large; therefore, a value obtained by correcting the charge time $T_C$ obtained by direct current measurement can be used as a measurement value T used for detecting an occupant (S54).

Then, the thus determined measurement value T is compared with a predetermined threshold value, so that it can be determined whether an occupant is present in the seat, and whether the occupant is an adult or a child, for example (S55). The measurement value T determined in step S53 or S54 or the determination result obtained in step S55 may be transmitted to the outside for use in control of deployment of an air bag (S56).

In the above step S54, the charge time $T_C$ may be corrected by, for example, multiplying the measured charge time $T_C$ by a given coefficient, or adding a given value to the measured charge time $T_C$. The coefficient and the value added may be changed in accordance with the amount or degree of disturbance, such as wetness of the seat. Also, the charge time $T_C$ may be corrected based on a function or table that optimally represents the relationship of $T_A$, $T_C$ with respect to the amount or degree of disturbance, such as wetness of the seat. Instead of correcting the measurement value, the threshold value used for making a determination on an occupant may be corrected in accordance with the amount or degree of disturbance, such as wetness of the seat. The above-indicated coefficient, added value, function, table, and threshold value may be determined in advance by testing, for each arrangement of the seat and the electrode(s) and each vehicle type.

In the detecting step S5, the sum Ta of the rise delay time Tu and the fall delay time Td may be obtained; and an occupant may be detected based on the sum Ta. The sum Ta of the delay times corresponds to the magnitude of the capacitance between the detection electrode and ground (see FIG. 8), and undergoes only small changes even in a condition where the seat is wet (see FIG. 11 and FIG. 16). Accordingly, it can be determined that an occupant is present in the seat when the sum Ta of the delay times is larger than a predetermined threshold value. Furthermore, the body size or shape of the occupant (e.g., whether the occupant is an adult or a child) can be determined based on the value of the charge time $T_C$ obtained by direct current measurement, or a value obtained by correcting the charge time $T_C$. In addition, according to the occupant detecting method, the operation of the occupant detection system, detection program, reference values and threshold values for use in determinations, and so forth, can be changed based on information obtained from the phase lag time $T_A$ obtained by phase difference measurement and the charge time $T_C$ obtained by direct current measurement. If it is determined that a correct determination cannot be made due to a disturbance, such as wetting of the seat, an alarm, or the like, may be generated.

It is to be understood that the invention is not limited to the above-described embodiments, but may be embodied with various changes or modifications within the range of the invention, depending on the object of the invention and its use or application.

The system of the invention is widely used as an occupant detection system that detects if an occupant is seated in a vehicle seat. The system may also be used as a system for detecting a person on a bed that is likely to get wet, or a person sitting in a chair, or the like.

What is claimed is:

1. An occupant detection system, comprising:
   a detection electrode provided in at least one of a seat bottom and a seatback of a seat;
   a phase difference measuring unit that supplies a reference signal comprising a sinusoidal wave to the detection electrode via a resistive element, detects the potential of the detection electrode as an electrode signal, and measures a phase lag time of the electrode signal relative to the reference signal;

a direct current measuring unit that applies a steady DC voltage to the detection electrode via a resistive element, detects the potential of the detection electrode, and measures time it takes from start of application of the DC voltage to the detection electrode to the time when the detection electrode reaches a given potential, as a charge time; and a detecting unit that detects an occupant based on the phase lag time and the charge time, using the phase difference measuring unit and the direct current measuring unit.

2. The occupant detection system according to claim 1, wherein when the phase lag time exceeds a predetermined value, the detecting unit corrects the charge time in accordance with the phase lag time, and detects an occupant based on the corrected charge time.

3. The occupant detection system according to claim 1, further comprising a switching circuit that connects one of the phase difference measuring unit and the direct current measuring unit with the detection electrode.

4. The occupant detection system according to claim 1, wherein the detection electrode comprises a conductive cloth, and the conductive cloth is formed as a surface material of the seat, or the detection electrode is disposed immediately below the surface material.

5. The occupant detection system according to claim 4, wherein the conductive, cloth is a woven fabric into which conductive fibers are woven at fixed intervals.

6. The occupant detection system according to claim 1, wherein:

the phase difference measuring unit includes a first comparator circuit that produces a binary reference phase signal by comparing the voltage of the reference signal with a first threshold value, and a second comparator circuit that produces a binary electrode phase signal by comparing the electrode signal with a second threshold value, wherein the second threshold value is set so that a phase of the reference signal at a point at which the reference signal passes the first threshold value is substantially the same as that of the electrode signal at a point at which the electrode signal passes the second threshold value; and as the phase lag time, a delay of a rise of the electrode phase signal relative to a rise of the reference phase signal is measured as a rise delay time, and a delay of a fall of the electrode phase signal relative to a fall of the reference phase signal is measured as a fall delay time.

7. The occupant detection system according to claim 6, wherein the electrode signal is produced as a signal having substantially the same amplitude as that of the reference signal, and the second threshold value is set to the same value as the first threshold value.

8. The occupant detection system according to claim 6, wherein the detecting unit obtains a sum of the rise delay time and the fall delay time, and detects an occupant based on the sum and the charge time.

9. The occupant detection system according to claim 1, wherein:

the direct current measuring unit includes a voltage application circuit that applies the steady DC voltage to the detection electrode, and a potential detection circuit that makes a determination that a voltage between the detection electrode and ground reaches a predetermined threshold value; and a length of time it takes from the time when the voltage application circuit starts application of the DC voltage to the time when the determination is made by the potential detection circuit is measured as the charge time.

10. The occupant detection system according to claim 9, wherein the detecting unit determines a seating posture of the occupant or a body size of the occupant, based on the charge time measured by the direct current measuring unit.

* * * * *

UNITED STATES PATENT AND TRADEMARK OFFICE
CERTIFICATE OF CORRECTION

| | | |
|---|---|---|
| PATENT NO. | : 8,519,725 B2 | Page 1 of 1 |
| APPLICATION NO. | : 13/042753 | |
| DATED | : August 27, 2013 | |
| INVENTOR(S) | : Hideki Uno et al. | |

It is certified that error appears in the above-identified patent and that said Letters Patent is hereby corrected as shown below:

In the Claims

Column 19, line 27 (claim 5, line 2) change "conductive, cloth" to read -- conductive cloth --.

Signed and Sealed this
Sixth Day of May, 2014

Michelle K. Lee
*Deputy Director of the United States Patent and Trademark Office*